US012772367B2

(12) United States Patent
Hori et al.

(10) Patent No.: US 12,772,367 B2
(45) Date of Patent: Oct. 20, 2026

(54) GENERATOR

(71) Applicant: National University Corporation Tokai National Higher Education and Research System, Nagoya (JP)

(72) Inventors: Masaru Hori, Nagoya (JP); Osamu Oda, Nagoya (JP)

(73) Assignee: National University Corporation Tokai National Higher Education and Research System, Nagoya (JP)

( * ) Notice: Subject to any disclaimer, the term of this patent is extended or adjusted under 35 U.S.C. 154(b) by 77 days.

(21) Appl. No.: 18/998,730

(22) PCT Filed: Jul. 25, 2023

(86) PCT No.: PCT/JP2023/027171
§ 371 (c)(1),
(2) Date: Jan. 27, 2025

(87) PCT Pub. No.: WO2024/024779
PCT Pub. Date: Feb. 1, 2024

(65) Prior Publication Data
US 2026/0040427 A1 Feb. 5, 2026

(30) Foreign Application Priority Data
Jul. 27, 2022 (JP) ................................ 2022-119807

(51) Int. Cl.
*H05H 1/46* (2006.01)
*H05H 1/24* (2006.01)

(52) U.S. Cl.
CPC .......... *H05H 1/463* (2021.05); *H05H 1/2465* (2021.05); *H05H 2245/10* (2021.05)

(58) Field of Classification Search
CPC ...... H05H 1/24; H05H 1/2443; H05H 1/2465; H05H 1/30; H05H 1/46; H05H 1/463
See application file for complete search history.

(56) References Cited

U.S. PATENT DOCUMENTS

2013/0062014 A1* 3/2013 Koo ....................... B23K 10/00 156/345.11
2013/0220223 A1* 8/2013 Hori ...................... C30B 29/403 118/723 MP
(Continued)

FOREIGN PATENT DOCUMENTS

JP 2000282243 A 10/2000
JP 2007207477 A 8/2007
(Continued)

OTHER PUBLICATIONS

International Search Report for the corresponding PCT Application No. PCT/JP2023/027171 with English translation and the cited reference(s) with an English abstract; pp. 1-4.

*Primary Examiner* — Jason M Crawford
(74) *Attorney, Agent, or Firm* — Muncy, Geissler, Olds & Lowe, P.C.

(57) ABSTRACT

A generator includes a plasma production tube made of a dielectric at least on a surface of the plasma production tube; an antenna that includes a linear conductor and a dielectric that coats the conductor; a high-frequency power supply connected to the antenna; and a gas supply unit that supplies a gas for generating radicals or ions to an interior of the plasma production tube. The antenna is disposed to extend to a vicinity of the other end of the plasma production tube. The antenna is disposed in a groove formed in an axial direction on an inner surface of the plasma production tube. The antenna is disposed in a groove formed in a circumferential direction on an inner surface of the plasma production tube at least in a portion of the vicinity of the other end of the plasma production tube.

12 Claims, 4 Drawing Sheets

(56) References Cited

U.S. PATENT DOCUMENTS

| | | | | |
|---|---|---|---|---|
| 2014/0066838 | A1* | 3/2014 | Hancock | A61L 2/14 604/23 |
| 2016/0181068 | A1* | 6/2016 | Hori | H01J 37/32669 118/723 MP |
| 2026/0040427 | A1* | 2/2026 | Hori | H05H 1/2465 |

FOREIGN PATENT DOCUMENTS

| | | | |
|---|---|---|---|
| JP | 2007213822 | A | 8/2007 |
| JP | 2012038568 | A | 2/2012 |
| WO | WO2016136669 | A1 | 9/2016 |

* cited by examiner

GENERATOR

TECHNICAL FIELD

The present disclosure relates to a generator that generates radicals or ions.

BACKGROUND ART

The apparatus described in Patent Literature 1 is known as a plasma generator for generating an inductively coupled plasma. Patent Literature 1 discloses an ion source comprised of a low inductance internal antenna, a dielectric chamber that encases the low inductance internal antenna inside, and a vacuum chamber that holds the dielectric chamber and an extraction electrode inside.

RELATED-ART LITERATURE

Patent Literature

Patent Literature 1: JP2012-38568

SUMMARY OF INVENTION

Technical Problem

We have arrived at a technology for treating a gas with a plasma and generating radicals or ions more efficiently than in the related art.

The present disclosure addresses the issues described above, and a purpose thereof is to provide a generator capable of generating radicals or ions more efficiently than in the related art.

Solution to Problem

A generator according to an embodiment of the present disclosure includes: a plasma production tube made of a dielectric at least on a surface of the plasma production tube; an antenna that includes a linear conductor and a dielectric that coats the conductor; a high-frequency power supply connected to the antenna; and a gas supply unit that supplies a gas for generating radicals or ions to an interior of the plasma production tube. One end of the plasma production tube is connected to the gas supply unit, the other end of the plasma production tube is a discharge port for radicals or ions produced inside the plasma production tube, both ends of the antenna are guided outside the plasma production tube from the one end of the plasma production tube and are connected to the high-frequency power supply, a high-frequency power is supplied from the high-frequency power supply to the antenna thereby generating an inductively coupled plasma inside the plasma production tube to generate radicals or ions from the gas, the antenna is disposed to extend to a vicinity of the other end of the plasma production tube, the antenna is disposed in a groove formed in an axial direction on an inner surface of the plasma production tube at least in a portion in a range from the one end to the vicinity of the other end of the plasma production tube, and the antenna is disposed in a groove formed in a circumferential direction on an inner surface of the plasma production tube at least in a portion of the vicinity of the other end of the plasma production tube.

Advantageous Effects of Invention

According to the present disclosure, a generator capable of generating radicals or ions more efficiently than in the related art can be provided.

DESCRIPTION OF EMBODIMENTS

Figure 1A:
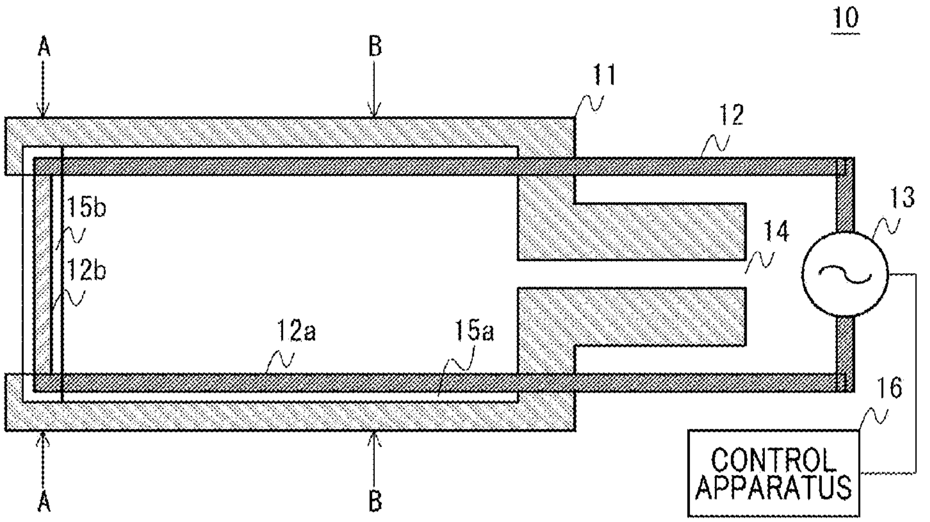
FIGS. 1A, 1B, and 1C schematically show a configuration of the generator.
Figure 1B:
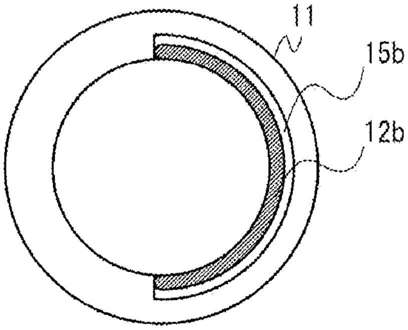
Figure 1C:
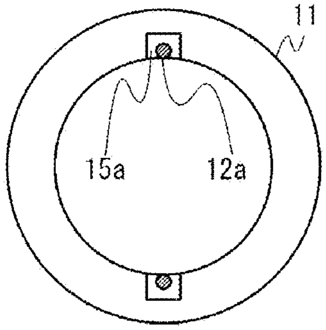

FIGS. 1A, 1B, and 1C show a configuration of the generator according to the embodiment of the present disclosure. FIG. 1A schematically shows a configuration of the generator 10. FIG. 1B is an AA cross-sectional view of FIG. 1A. FIG. 1C is a BB cross-sectional view of FIG. 1A.

The generator 10 includes a plasma production tube 11, an antenna 12, a high-frequency power supply 13, a gas supply unit 14, and a control apparatus 16.

The plasma production tube 11 is made of a dielectric at least on its surface and has a cylindrical shape having upper and lower openings. The plasma production tube 11 may be made entirely of a dielectric or may be configured by covering the inner wall of the cylinder made of a metal, etc. with a dielectric such as molten quartz. The dielectric may be, for example, quartz, alumina, aluminum nitride, etc.

The antenna 12 includes a linear conductor and a dielectric that coats the conductor. The conductor may be, for example, a metal conductor such as copper and tungsten or may be a graphite member, etc. The dielectric preferably has plasma resistance, insulation property, physical strength, and chemical stability and may be, for example, alumina, quartz, zirconia, aluminum nitride, boron nitride, yttria, etc. Since the conductor is coated with a dielectric, the antenna voltage generated in the antenna 12 when a high-frequency power is applied is small. Accordingly, fluctuation of the plasma potential can be suppressed to a small level.

The high-frequency power supply 13 is connected to the antenna 12 and supplies a high-frequency current to the antenna 12. Both ends of the antenna 12 are guided outside the plasma production tube 11 from one end of the plasma production tube 11 (the right end of FIG. 1A) and are connected to the high-frequency power supply 13. One end of the conductor may or may not be grounded.

The gas supply unit 14 supplies a gas for generating radicals or ions to the interior of the plasma production tube 11. One end of the plasma production tube 11 (the right end of FIG. 1A) is connected to the gas supply unit 14. The other end of the plasma production tube 11 (the left end of FIG. 1A) is a discharge port for radicals or ions produced inside the plasma production tube 11. The gas is a gas corresponding to the type of radicals or ions desired to be generated. For example, the gas may be a gas highly corrosive to a metal such as chlorine, boron trichloride, silicon tetrachloride, carbon tetrachloride, fluorine, carbon tetrafluoride, $CHF_3$, $CH_2F_2$, c-$C_4F_8$, $C_3F_6$, c-$C_5F_8$. The gas may be a noble gas such as argon or may be nitrogen, oxygen, hydrogen, etc.

The control apparatus 16 controls each feature of the generator 10. The control apparatus 16 supplies the gas from the gas supply unit 14 to the interior of the plasma production tube 11 and supplies a high-frequency power from the high-frequency power supply 13 to the antenna 12. Thereby, an inductively coupled plasma is generated inside the plasma production tube 11, and radicals or ions are generated from the gas. Radicals or ions thus generated are discharged from the other end of the plasma production tube 11 (the left end of FIG. 1A). Thereby, the surface of an object to be treated can be irradiated with radicals or ions for etching, surface treatment, deposition, etc. In the generator 10 according to the embodiment, an inductively coupled plasma is generated inside the plasma production tube 11 made of a dielectric at least on its surface. Therefore, radicals or ions can be generated from a gas that is highly corrosive to a metal (e.g., a halogenated gas). Accordingly, the generator 10 is adapted to generate a variety of radicals or ions.

As shown in FIG. 1A, the antenna 12 is disposed to extend to the vicinity of the other end of the plasma production tube 11 (the left end of FIG. 1A). Thereby, a plasma can be generated over almost the entirety of the interior of the plasma production tube 11 so that the efficiency of generation of radicals or ions can be improved. The antenna 12 may be disposed over 50% or more, 60% or more, 70% or more, 80% or more, 90% or more, and 95% or more of the axial length inside the plasma production tube 11.

As shown in FIGS. 1A and 1C, the antenna 12*a* is disposed in a groove 15*a* formed in the axial direction on the inner surface of the plasma production tube 11 at least in a portion in a range from one end (the right end of FIG. 1A) to the vicinity of the other end (left end of FIG. 1A). Thereby, a plasma can be generated over the entirety of the interior of the plasma production tube 11 so that the efficiency of generation of radicals or ions can be improved. The antenna 12*a* may be disposed over 50% or more, 60% or more, 70% or more, 80% or more, 90% or more, 95% or more, and 100% of the axial length inside the plasma production tube 11. The antenna 12*a* may be disposed to be in contact with the inner surface of the plasma production tube 11 at least in a portion in a range from one end (the right end of FIG. 1A) to the vicinity of the other end (the left end of FIG. 1A). In this case, the groove 15*a* may not be provided.

Further, as shown in FIGS. 1A and 1B, the antenna 12*b* is disposed in a groove 15*b* formed in the circumferential direction on the inner surface of the plasma production tube 11 at least in a portion of the vicinity of the other end (the left end of FIG. 1A). Thereby, a plasma can be generated over the entirety of the interior of the plasma production tube 11 so that the efficiency of generation of radicals or ions can be improved. Further, it is possible to inhibit radicals or ions generated inside the plasma production tube 11 and released from the discharge port from colliding with the antenna 12*b* so that the loss of radicals or ions can be reduced. The antenna 12*b* may be disposed over 50% or more, 60% or more, 70% or more, 80% or more, 90% or more, 95% or more, and 100% of the circumferential length inside the plasma production tube 11. The antenna 12*b* may be disposed to be in contact with the inner surface at least in a portion of the vicinity of the other end of the plasma production tube 11 (the left end of FIG. 1A). In this case, the groove 15*b* may not be provided.

Inside the plasma production tube 11, the aspect ratio between the axial length and the width of the antenna 12 may be 2 or more. The aspect ratio is a value obtained by dividing the length in the direction perpendicular to the inner wall of the plasma production tube 11 by the length in the direction parallel to the inner wall. As shown in JP2004-200232, etc., the electron energy in the plasma can be controlled by changing the aspect ratio of the antenna 12. An apparatus using the antenna 12 having an aspect ratio of 2 or more can produce more high-energy electrons (10-18 eV) and a higher plasma density than an apparatus using the antenna 12 having an aspect ratio of less than 2.

Figure 2A:
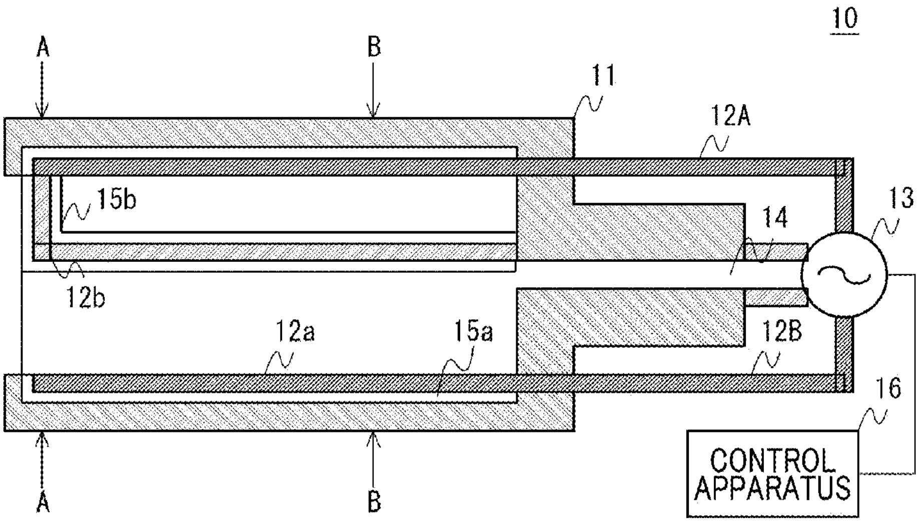
FIGS. 2A, 2B, and 2C schematically show a configuration of the generator.
Figure 2B:
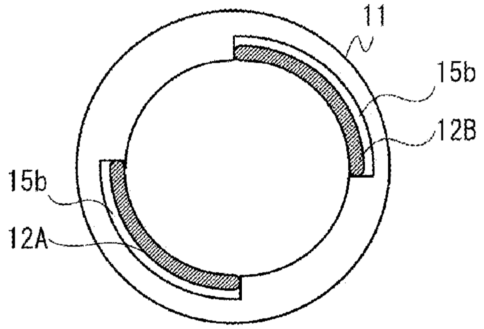
Figure 2C:
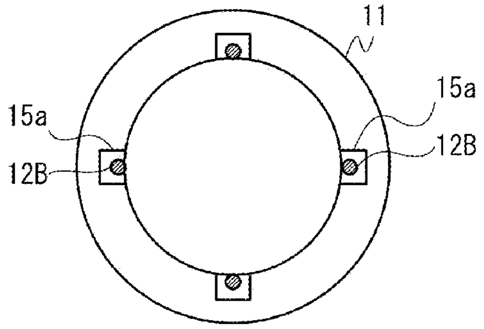

FIGS. 2A, 2B, and 2C show another exemplary configuration of the generator according to the embodiment of the present disclosure. FIG. 2A schematically shows a configuration of the generator 10. FIG. 2B is an AA cross-sectional view of FIG. 2A. FIG. 2C is a BB cross-sectional view of FIG. 1A.

The generator 10 shown in FIGS. 2A, 2B, and 2C includes two antennas 12A and 12B. The other features and the operation are the same as those of the generator 10 shown in FIGS. 1A, 1B, and 1C.

The control apparatus 16 controls the phase difference in the high-frequency power supplied from the high-frequency power supply 13 to the two antennas 12A, 12B. As shown in JP2007-149639, etc. the energy and the electron density of the generated electrons can be controlled by controlling the distance and phase difference between the two high-frequency antennas. In the case a current is supplied to the two antennas 12A and 12B in the same direction, the electron energy decreases and the electron density increases as the phase difference increases from 0° to 180°. In the case a current is supplied to the two antennas 12A, 12B in opposite directions, the electron energy increases and the electron density decreases as the phase difference increases from 0° to 180°. In the case the position of at least one of the two antennas 12A and 12B is variable, the control apparatus 16 may control the position of the two antennas 12A and 12B. Either in the case of supplying a current to the two antennas 12A and 12B in the same direction or in the case of supplying a current in opposite directions, the larger the distance between the two antennas 12A and 12B, the greater the energy of electrons and the larger the electron density. The control apparatus 16 may control the distance and phase difference between the two antennas 12A and 12B so that electrons of appropriate energy and density are generated according to the type, density, amount, temperature of radicals or ions generated, the type, pressure, amount, temperature of the gas, etc.

Exemplary Application

An example of generating oxygen radicals from ozone in a production apparatus for depositing β-type gallium oxide will be described.

Gallium oxide ($Ga_2O_3$) exhibits various crystal structures such as α type, β type, γ type, δ type, and ε type. Of these, β-type gallium oxide is a stable phase at low temperature and normal pressure. The bandgap of β-type gallium oxide is about 4.5 eV to 4.9 eV, which is larger than the band gap of 4H—SiC (3.26 eV) and GaN (3.39 eV). For this reason, β-type gallium oxide is expected to be a semiconductor material having great dielectric breakdown strength.

The β-type gallium oxide film production apparatus epitaxially grows a β-type gallium oxide film on a substrate with a (001) plane orientation of β-type gallium oxide. The production apparatus includes a first plasma generating unit and a second plasma generating unit. The first plasma generation unit generates a mixed gas of oxygen and ozone by turning an oxygen gas into a plasma. The second plasma generation unit dissociates ozone by turning the mixed gas of oxygen and ozone into a plasma.

A description will now be given of oxygen atoms considered to be involved in the reaction.

In the singlet oxygen atom $O(^1D)$, all electrons in the 2p orbital are paired. In the triplet oxygen atom $O(^3P)$, a pair of electrons and two unpaired electrons are in the 2p orbital. The energy of the singlet oxygen atom $O(^1D)$ is about 1.97 eV higher than the energy of the triplet oxygen atom $O(^3P)$, which is the ground state of the oxygen atom. For this reason, the singlet oxygen atom $O(^1D)$ transitions to the triplet oxygen atom $O(^3P)$ with the passage of a predetermined time. In addition, the oxidizing power of the singlet oxygen atom $O(^1D)$ is stronger than that of the triplet oxygen atom $O(^3P)$. The redox potential of the oxygen constituent particles is discussed below. The oxidizing power of the triplet oxygen atom $O(^3P)$ is stronger than that of ozone, and, furthermore, the oxidizing power of the singlet oxygen atom $O(^1D)$ is strongest, although the redox potential is unknown.

| | |
|---|---|
| Oxygen molecule (ground state) | 1.23 eV |
| Ozone | 2.08 eV |
| Triplet oxygen atom $O(^3P)$ | 2.42 eV |
| Single unit oxygen atom $O(^1D)$ | 4.39 eV |

When a gallium atom (Ga) and an oxygen atom (O) react on the surface of a substrate, etc., $Ga_2O$ is formed according to formula (a) below, wherein, (surface) means a state in which an element, etc. is adsorbed on the substrate surface.

$$2Ga\ (surface) + O\ (surface) \rightarrow Ga_2O\ (surface) \quad (a)$$

When $Ga_2O$ and an oxygen atom (O) react on the surface of a substrate, etc., $Ga_2O_3$ is formed according to formula (b) below.

$$Ga_2O\ (surface) + 2O\ (surface) \rightarrow Ga_2O_3\ (solid) \quad (b)$$

As described above, it is considered that $Ga_2O_3$ is generated through the stages of formula (a) and formula (b). Since it is considered that the stronger the oxidizing power of the oxygen atom, the faster the reaction rate of formula (a) and formula (b), it is preferable to supply as many singlet oxygen atoms $O(^1D)$ as possible.

$Ga_2O$ adsorbed on the substrate surface is desorbed from the substrate surface as a gas at a temperature of about 300° C. or higher.

$$Ga_2O\ (surface) \rightarrow Ga_2O\ (gas) \quad (c)$$

For this reason, the substrate temperature is preferably 300° C. or less. Conventionally, gallium oxide is grown by using the triplet oxygen atom $O(^3P)$ or ozone, which have a weaker oxidizing power than the singlet oxygen atom $O(^1D)$ (see formula (b)). For this reason, it has been necessary to grow gallium oxide at a high temperature of about 700° C. to compensate for the weak oxidizing power. At a high temperature of about 700° C., however, the reaction of formula (c) is promoted so that it is presumed that the growth rate of gallium oxide is slowed. According to the technology of the present disclosure, on the other hand, the singlet oxygen atom $O(^1D)$ having a strong oxidizing power can be efficiently produced so that gallium oxide can be grown even at a temperature of 300° C. or less (see formula (b)), and the reaction of formula (c) can be inhibited. It is therefore considered that the growth rate of gallium oxide is increased. It can also be considered that gallium oxide can be grown even at a temperature of 300° C. or less because a large amount of triplet oxygen atoms $O(^3P)$ produced as a result of transition from a large amount of singlet oxygen atoms $O(^1D)$ generated can be supplied to the substrate surface.

Figure 3:
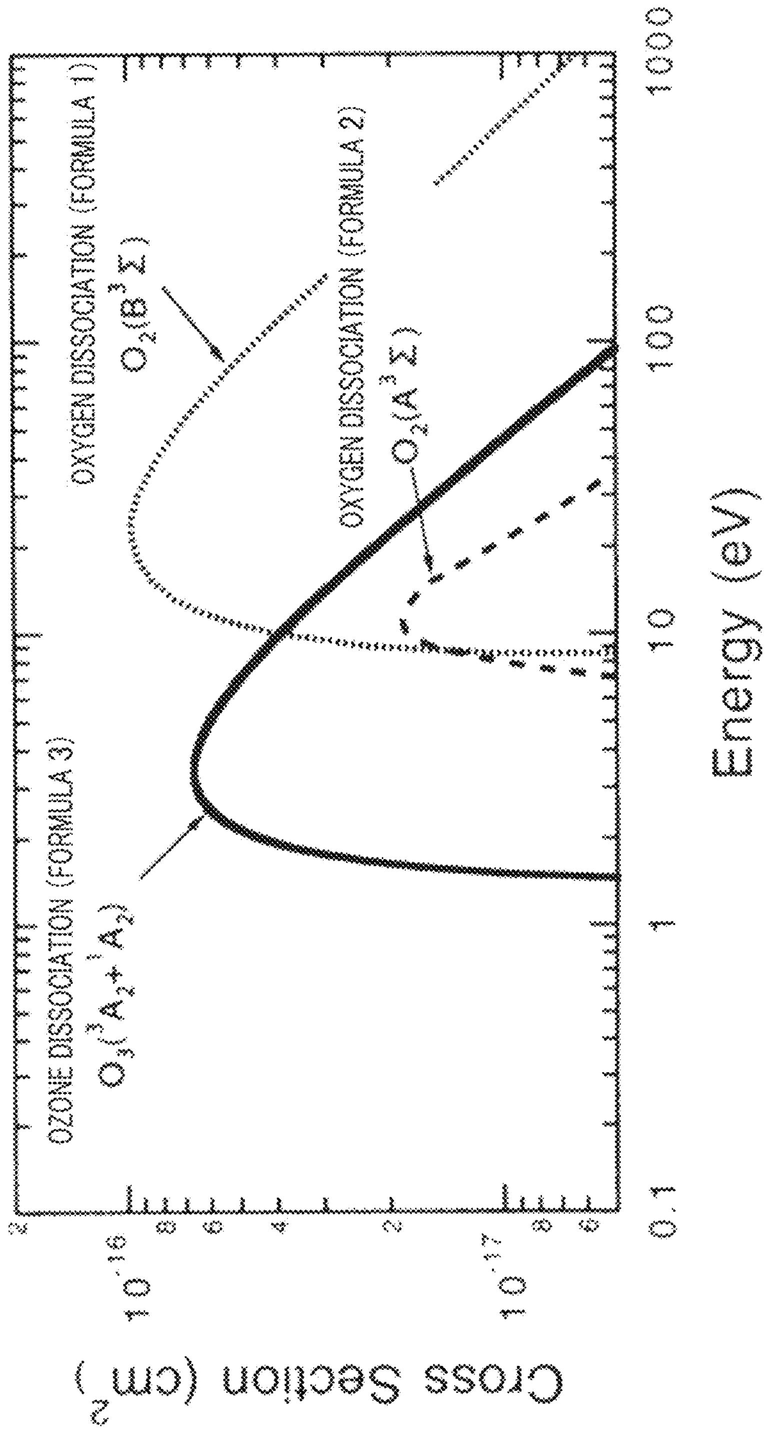
FIG. 3 is a graph showing the dissociative collision cross-sectional area of formula (1), formula (2), and formula (3).

FIG. 3 is a graph showing the dissociative collision cross-sectional area of formula (1), formula (2), and formula (3) below.

$$e + O_2 \xrightarrow{k_1} e + O_2\left(B^3\sum\nolimits_u^-\right) \rightarrow e + O(^3P) + O(^1D) \quad (1)$$

$$e + O_2 \xrightarrow{k_2} e + O_2\left(A^3\sum\nolimits_u^+\right) \rightarrow e + O(^3P) + O(^3P) \quad (2)$$

$$e + O_3 \xrightarrow{k_3} e + O_2(a) + O(^1D) \quad (3)$$

Formula (1) shows a reaction in which an oxygen molecule and an electron collide to produce a triplet oxygen atom $O(^3P)$ and a singlet oxygen atom $O(^1D)$. Formula (2) shows a reaction in which an oxygen molecule and an electron collide to produce two triplet oxygen atoms $O(^3P)$. Formula (3) shows a reaction in which ozone molecule and an electron collide to produce an oxygen molecule and a singlet oxygen atom $O(^1D)$.

Referring to FIG. 3, the energy corresponding to the peak of formula (1) is about 30 eV. The energy corresponding to the peak of formula (2) is about 10 eV. The energy corresponding to the peak of formula (3) is about 3 eV. The larger the cross-sectional area, the more likely the reaction is to occur.

Comparing the energy corresponding to the peak of formula (1) and the energy corresponding to the peak of formula (3), the energy of the peak of formula (3) is about one-tenth of the energy of the peak of formula (1). For this reason, it is considered that more singlet oxygen atoms $O(^1D)$ can be produced by generating ozone initially and then decomposing the ozone as shown in formula (3).

Therefore, turning a mixed gas of oxygen and ozone into a plasma in the production apparatus dissociates ozone to generate more singlet oxygen atoms $O(^1D)$ than otherwise. Thereby, the deposition rate of β-type gallium oxide can be improved.

Figure 4:
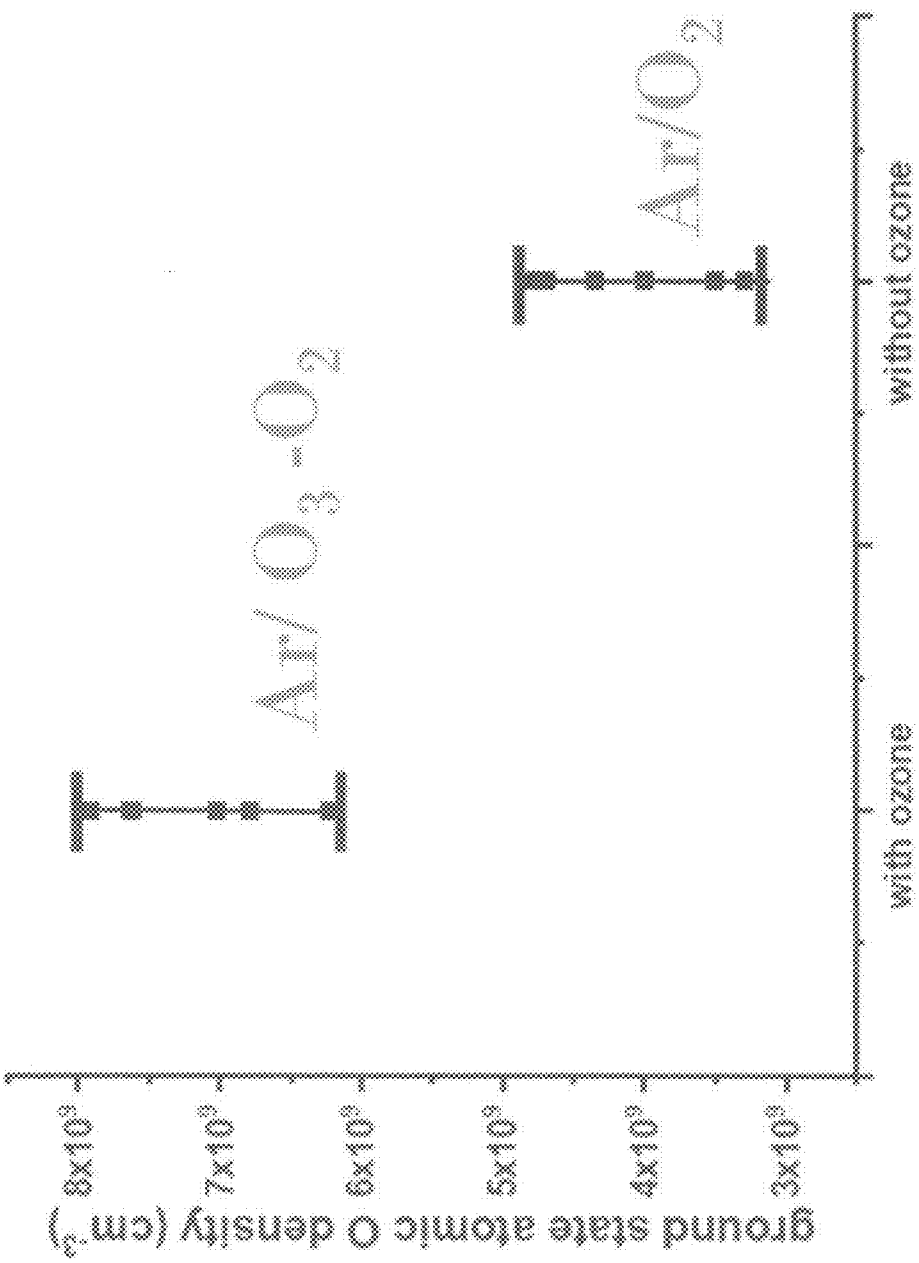
FIG. 4 shows the triplet oxygen atom $O(^3P)$ density that results when only an oxygen gas is turned into a plasma and when a mixed gas of oxygen and ozone is turned into a plasma.

FIG. 4 shows the triplet oxygen atom $O(^3P)$ density that results when only an oxygen gas is turned into a plasma and when a mixed gas of oxygen and ozone is turned into a plasma. The triplet oxygen atom $O(^3P)$ density was measured in the production apparatus, where the internal pressure of the reaction chamber is 5 Pa, the plasma output is 900 W, the flow rate of Ar gas is 12 sccm, the flow rate of an oxygen gas or a mixed gas of oxygen and ozone is 2 sccm, and the density of ozone in the mixed gas of oxygen and ozone is 28 vol %.

As shown in FIG. 4, the average value of the density of the triplet oxygen atom $O(^3P)$ that results when only the oxygen gas was turned into a plasma was approximately $4\times10^9$ $cm^{-3}$. The average value of the density of the triplet oxygen atom $O(^3P)$ that results when the mixed gas of oxygen and ozone was turned into a plasma was approximately $7\times10^9$ $cm^{-3}$. It demonstrates that an increase of about 75% in the triplet oxygen atom $O(^3P)$ density results when the mixed gas of oxygen gas and ozone is used instead of the oxygen gas.

The singlet oxygen atom $O(^1D)$ is in an excited state about 1.97 eV higher than the triplet oxygen atom $O(^3P)$ and so transitions to the triplet oxygen atom $O(^3P)$ easily. That is, the measurement of the triplet oxygen atom $O(^3P)$ includes oxygen atoms that had been the singlet oxygen atom $O(^1D)$.

Thus, turning a mixed gas of oxygen and ozone into a plasma generates more singlet oxygen atoms $O(^1D)$ and triplet oxygen atoms $O(^3P)$ so that the deposition rate of β-type gallium oxide can be improved.

According to the technology of the present disclosure, high energy electrons can be generated more efficiently than in the related art so that the reaction of formula (1) can also be induced efficiently. In the case of producing the triplet oxygen atom $O(^3P)$ and the singlet oxygen atom $O(^1D)$ from oxygen molecules according to the reaction of formula (1), the production apparatus may not include the first plasma generation unit.

The present disclosure has been described above based on an exemplary embodiment. The embodiment is intended to be illustrative only and it will be understood by those skilled in the art that various modifications to constituting elements and processes could be developed and that such modifications are also within the scope of the disclosure.

INDUSTRIAL APPLICABILITY

The present disclosure can be used in generators that generate radicals or ions.

The invention claimed is:

1. A generator comprising:

a plasma production tube made of a dielectric at least on a surface of the plasma production tube;

an antenna that includes a linear conductor and a dielectric that coats the conductor;

a high-frequency power supply connected to the antenna; and a gas supply unit that supplies a gas for generating radicals or ions to an interior of the plasma production tube, wherein one end of the plasma production tube is connected to the gas supply unit, wherein the other end of the plasma production tube is a discharge port for radicals or ions produced inside the plasma production tube, wherein both ends of the antenna are guided outside the plasma production tube from the one end of the plasma production tube and are connected to the high-frequency power supply, wherein a high-frequency power is supplied from the high-frequency power supply to the antenna thereby generating an inductively coupled plasma inside the plasma production tube to generate radicals or ions from the gas, wherein the antenna is disposed to extend to a vicinity of the other end of the plasma production tube, wherein the antenna is disposed in a groove formed in an axial direction on an inner surface of the plasma production tube at least in a portion in a range from the one end to the vicinity of the other end of the plasma production tube, and wherein the antenna is disposed in a groove formed in a circumferential direction on an inner surface of the plasma production tube at least in a portion of the vicinity of the other end of the plasma production tube.

2. The generator according to claim 1, comprising:

a plurality of antennas.

3. The generator according to claim 2, comprising:

a control apparatus that controls a distance between the plurality of antennas or a phase difference in the high-frequency power supplied to the plurality of antennas.

4. The generator according to claim 3, wherein an aspect ratio between an axial length and a width of the antenna is 2 or more.

5. The generator according to claim 4, wherein the gas is ozone, and oxygen radicals are generated from the ozone.

6. The generator according to claim 3, wherein the gas is ozone, and oxygen radicals are generated from the ozone.

7. The generator according to claim 2, wherein an aspect ratio between an axial length and a width of the antenna is 2 or more.

8. The generator according to claim 7, wherein the gas is ozone, and oxygen radicals are generated from the ozone.

9. The generator according to claim 2, wherein the gas is ozone, and oxygen radicals are generated from the ozone.

10. The generator according to claim 1, wherein an aspect ratio between an axial length and a width of the antenna is 2 or more.

11. The generator according to claim 10, wherein the gas is ozone, and oxygen radicals are generated from the ozone.

12. The generator according to claim 1, wherein the gas is ozone, and oxygen radicals are generated from the ozone.

* * * * *